United States Patent [19]
Ando et al.

[11] Patent Number: 4,711,810
[45] Date of Patent: Dec. 8, 1987

[54] MAGNETIC MEDIUM FOR HORIZONTAL MAGNETIZATION RECORDING AND METHOD FOR MAKING SAME

[75] Inventors: Toshio Ando, Fujisawa; Toshikazu Nishihara, Zama; Akihiro Kimura, Sagamihara, all of Japan

[73] Assignee: Victor Company of Japan, Ltd., Japan

[21] Appl. No.: 792,046

[22] Filed: Oct. 28, 1985

[30] Foreign Application Priority Data

Oct. 29, 1984 [JP] Japan ................... 59-225830
Nov. 12, 1984 [JP] Japan ................... 59-236598

[51] Int. Cl.$^4$ .................. G11B 5/64; H01F 10/00
[52] U.S. Cl. ...................... 428/336; 428/472; 428/694; 428/900
[58] Field of Search ............. 428/694, 900, 972; 928/336

[56] References Cited

U.S. PATENT DOCUMENTS

| | | | |
|---|---|---|---|
| 4,323,629 | 4/1982 | Kumeda et al. | 428/900 |
| 4,382,110 | 5/1983 | Takagi et al. | 428/336 |
| 4,385,098 | 5/1983 | Sngita et al. | 428/900 |
| 4,511,635 | 4/1985 | Nagao et al. | 428/900 |
| 4,592,948 | 6/1986 | Kohmoto et al. | 428/900 |
| 4,596,735 | 6/1986 | Noguchi et al. | 428/900 |
| 4,599,280 | 7/1986 | Izumi et al. | 428/900 |

FOREIGN PATENT DOCUMENTS 152517 9/1982 Japan.
59-17216 1/1984 Japan.

OTHER PUBLICATIONS

"Co-Cr Perpendicular Recording Medium by Vapor Deposition", Sngita et al, IEEE Journal, Nov. 1981.

Primary Examiner—George F. Lesmes
Assistant Examiner—William M. Atkinson
Attorney, Agent, or Firm—Lowe, Price, LeBlanc, Becker & Shur

[57] ABSTRACT

A magnetic medium for horizontal magnetization recording which comprises a non-magnetic substrate and a magnetic recording film formed on at least one side of the substrate, is described. The magnetic recording film consists essentially of an amorphous Co-Cr alloy containing from 5 to 15 atomic percent of oxygen atoms. A method for making the above type of medium is also described in which the magnetic film is vapor deposited under conditions of a partial pressure of oxygen gas of $1 \times 10^{-3}$ to $3 \times 10^{-3}$ Torr., and a sputtering rate of from 0.05 to 0.15 $\mu$m/minute.

3 Claims, 1 Drawing Figure

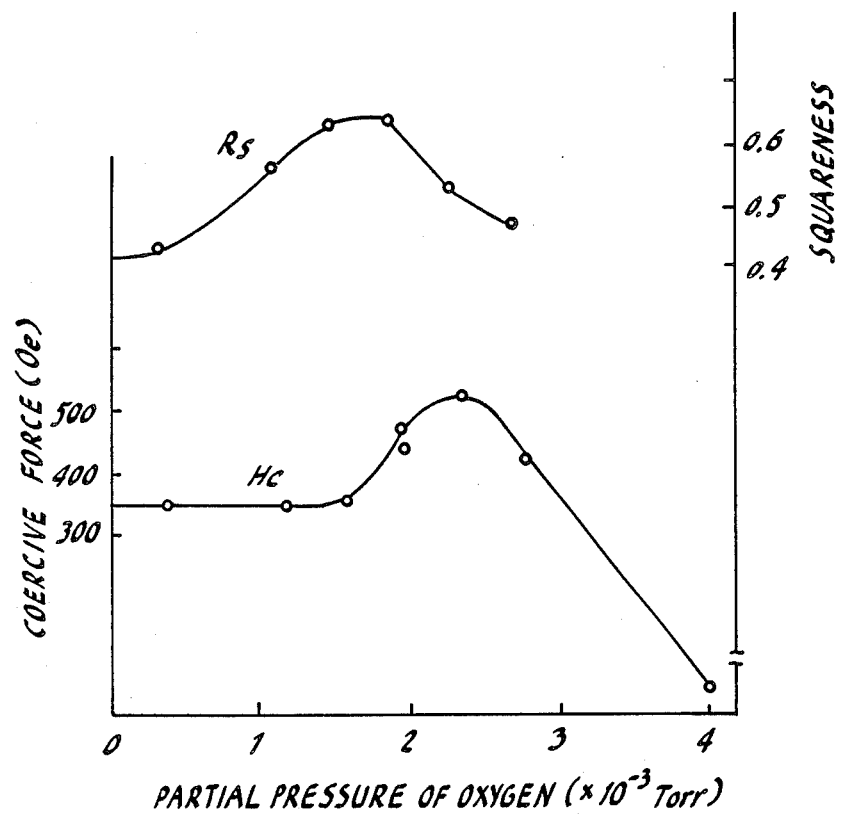

MAGNETIC MEDIUM FOR HORIZONTAL MAGNETIZATION RECORDING AND METHOD FOR MAKING SAME

BACKGROUND OF THE INVENTION

1. Field of the Invention

This invention relates to magnetic recording and more particularly, to a magnetic recording medium which is suitable for use in horizontal magnetic recording systems. Typical of the medium is a magnetic disc of the type which is recorded and reproduced by the use of a flying ring head. The invention also relates to a method for making such a recording medium.

2. Description of the Prior Art

For high density recording, magnetic recording mediums using metallic thin films have been recently developed and proposed. The thin films are formed on a substrate by sputtering, electroplating or electroless plating of magnetic materials such as, for example, Co, Co-Ni, Co-P, Co-Ni-P and the like.

However, this type of magnetic recording medium has a poor corrosion resistance and is not suitable for use under high humidity conditions. To avoid this, there has been proposed the provision of a corrosion-resistant layer on the magnetic thin layer. This is not advantageous, however, in view of the rise in cost because of the additional step of forming the corrosion-resistant layer. Moreover, the provision of the layer will increase the spacing of a magnetic head, which undesirably brings about a lowering of reproduction output.

Attention has now been paid to Co-Cr alloys because of the good corrosion resistance. Co-Cr alloys have also good vertical magnetic anisotropy, so that these alloys have been intensively studied as suited for vertical magnetization recording systems which involve little problem of self-demagnetization.

For the improvement of the vertical magnetic anisotropy, there has been proposed a high speed precipitation method in which Co-Cr magnetic grains are precipitated at a high speed of, for example, 5000 to 8000 angstrom/minute in an atmosphere of a gas containing $5 \times 10^{-6}$ Torr. of molecular oxygen, by which a Co-Cr vertical magnetization film containing about 2 to 8 atomic percent of segregated oxygen is formed on a substrate (Japanese Laid-open Patent Application No. 59-17216).

However, the above type of magnetic medium is disadvantageous in that when it is applied to a recording and reproducing apparatus using, for example, a magnetic ring head and particularly a flying ring head, the reproduction output becomes small. In this sense, the magnetic recording medium is not necessarily satisfactory with respect to recording and reproducing characteristic properties.

SUMMARY OF THE INVENTION

It is accordingly an object of the invention to provide a magnetic medium for horizontal magnetization recording which makes use of Co-Cr amorphous alloys as the magnetic recording layer and is able to reproduce information at a high output level.

It is another object of the invention to provide a magnetic medium for horizontal magnetization recording which is particularly suitable for use in a recording and reproducing apparatus using a flying ring head.

It is a further object of the invention to provide a method for making the magnetic medium of the type mentioned above.

The present invention provides a magnetic medium for horizontal magnetization recording which comprises a non-magnetic substrate and a magnetic recording film formed on at least one side of the substrate. The invention is characterized in that the magnetic recording film consists essentially of an amorphous Co—Cr alloy containing from 5 to 15 atomic percent of oxygen atoms.

The amorphous Co-Cr alloy film can be formed by subjecting a Co-Cr target to vapor deposition in an atmosphere of oxygen gas with a partial pressure of $1 \times 10^{-3}$ to $3 \times 10^{-3}$ Torr. at a sputtering rate of about 0.05 to 0.15 $\mu$m/minute. The ratio of the oxygen partial pressure to the total pressure in the atmosphere should preferably be in the range of 2 to 7:100.

BRIEF DESCRIPTION OF THE DRAWING

The sole FIGURE is a graphical representation of magnetic characteristics of a magnetic recording medium of the invention in relation to the oxygen gas pressure.

DETAILED DESCRIPTION AND EMBODIMENTS OF THE INVENTION

The Co-Cr alloys used in the present invention should contain from 5 to 15 atomic percent of oxygen as segregated and should be amorphous in nature. The Co content in the alloy used for these purposes is generally from 71 to 78 atomic percent. The content of Cr is from 15 to 19 atomic percent. The magnetic recording layer of the Co-Cr alloy is generally formed on a non-magnetic substrate in a thickness of from 0.05 to 0.3 $\mu$m.

The non-magnetic substrate may be glass, plastic, ceramic or metallic films, sheets or plates ordinarily used for these purposes. The substrate may be plated with NiP, or may be anodized, if possible, in order to improve the adhesion strength of a deposited film.

The Co-Cr amorphous alloy magnetic film comprising from 5 to 15 atomic percent oxygen has been found to have an isolated reproduction pulse which is not a double-humped pulse, revealing that the magnetic film is not a vertical magnetization film as in the known Co-Cr alloy-based mediums described before. On the contrary, the isolated reproduction pulse has been found to be a single-peak pulse, which is characteristic of a horizontal magnetization film. Thus, there is no room for doubt that the amorphous alloy magnetic film containing from 5 to 15 atomic percent of oxygen atoms is of the horizontal magnetization type.

When the reproduction output is determined using a ring head having a flying height of 0.25 $\mu$m, it is as high as about 0.8 mV or over.

This type of Co-Cr amorphous alloy magnetic layer can be formed according to a method of the invention in which Co-Cr target is vacuum deposited by a PVD technique such as, for example, sputtering, in an atmosphere of oxygen under conditions of about $1 \times 10^{-3}$ to $3 \times 10^{-3}$ Torr. at a sputtering rate of from about 0.05 to 0.15 $\mu$m/minute. The sputtering rate is preferably in the range of from 0.09 to 0.12 $\mu$m/minute.

Most preferably, the relation between the oxygen gas pressure, $P_{O_2}$ (Torr.) and the sputtering rate, SR, ($\mu$m/minute) should satisfy the following inequality $1 \times 10^{-2}$ Torr./($\mu$m/minute) $\leq P_{O_2}/SR \leq 3 \times 10^{-2}$ Torr./($\mu$m/minute)

As a matter of course, aside from oxygen gas, an inert gas such as Ar is added to the gas atmosphere at a pressure of, for example, from 14 to 150 mTorr. In this connection, it is preferred that the ratio of a partial pressure of oxygen to the total pressure in the deposition atmosphere is controlled to be in the range of 2 to 7:100. The temperature of a substrate is also controlled to be in the range of from room temperature to 300° C.

When the vaccuum deposition is carried out using a sputtering technique, the sputtering used in the practice of the invention may be a so-called "high rate and low temperature sputtering" in which the temperature rise of a substrate can be suppressed to an extent while increasing the sputtering rate. This sputtering technique is more particularly described in examples.

In general, the magnetic anisotropy can be classified into two groups including a shape magnetic anisotropy and a crystalline magnetic anisotropy. With magnetic thin films, the shape magnetic anisotropy is in the in-plane direction of the magnetic thin film because of the large area relative to the thickness of the film. However, a CoCr thin film is ordinarily obtained to have a hexagonal close packing structure and is thus oriented such that the c axis, which is an axis of easy magnetization, is vertical to the plane. As a result, the crystalline magnetic anisotropy in the vertical direction becomes greater than the shape magnetic anisotropy. This is why the Co-Cr thin film serves as a vertical magnetic film. The film of the invention is made of Co-Cr alloy into which oxygen is incorporated, so that the hexagonal close packing structure is turned amorphous, thereby reducing the crystalline magnetic anisotropy. In doing so, the shape magnetic anisotropy in the in-plane direction becomes predominant and thus, a horizontal magnetic film is formed. The reason why known Co-Cr alloy films containing oxygen as described before is of the vertical magnetic type is not known, but the known films are clearly crystallized because the boundary of crystal grains is discussed in the afore-indicated Japanese Laid-open Patent Application.

The invention is described in more detail by way of examples.

EXAMPLE 1

A Co-Cr target was subjected to sputtering under conditions of an Ar gas pressure of 100 mTorr., a power flux density of 1.0 W/cm$^2$, a sputtering rate of 130 angstrom/minute and an oxygen partial pressure of about 2 mTorr, thereby forming a 0.20 μm thick Co-Cr magnetic alloy film on a non-magnetic substrate in the form of a disc.

The Co-Cr alloy thin film formed on the magnetic disc was subjected to determination of a composition, revealing that the composition had 17 atomic percent of Cr, 9.7 atomic percent of O and the balance of Co. The magnetic disc was found to have a coercive force of 490 oersted in the in-plane direction of the medium and a squareness of 0.65. The magnetic layer was found not to be crystalline, but to be amorphous.

The magnetic disc was then subjected to a corrosion-resistant test in which it was allowed to stand for 200 hours under conditions of a temperature of 60° C. and a relative humidity of 90% . However, no change was recognized on the disc and thus, the disc was very resistant to corrosion.

The isolated reproduction pulse of the disc was determined with the result that the reproduction pulse was a single peak pulse which was characteristic of a horizontal magnetization film.

The magnetic disc was set in a recording and reproducing apparatus using a magnetic ring head having a flying height of 0.25 μm and tested to determine a reproduction output. As a result, it was found that the reproduction output was as high as 1 mV.

EXAMPLE 2

A Co-Cr target was subjected to sputtering under conditions of an Ar gas pressure of 150 mTorr., a power flux density of 1.0 W/cm$^2$, a sputtering rate of 130 angstrom/minute and an oxygen partial pressure of about 3 mTorr, thereby forming a 0.20 μm thick Co-Cr magnetic alloy film on a non-magnetic substrate in the form of a disc.

The Co-Cr alloy thin film formed on the magnetic disc was subjected to determination of a composition, revealing that the composition had 15 atomic percent of Cr, 14.1 atomic percent of O and the balance of Co. The magnetic disc was subjected to measurement of magnetic characteristics using a sample-vibrating magnetometer and found to have an in-plane coercive force of 510 oersted in the in-plane direction of the medium and a squareness of 0.50. The magnetic layer was found not to be crystalline, but to be amorphous.

The magnetic disc was then subjected to a corrosion-resistant test in which it was allowed to stand for 200 hours under conditions of a temperature of 60° C. and a relative humidity of 90%. However, no change was recognized on the disc and thus, the disc was very resistant to corrosion.

The isolated reproduction pulse of the disc was determined with the result that the reproduction pulse was a single peak pulse which was characteristic of a horizontal magnetization film.

The magnetic disc was set in a recording and reproducing apparatus using a magnetic ring head having a flying height of 0.25 μm and tested to determine a reproduction output. As a result, it was found that the reproduction output was as high as 0.8 mV.

COMPARATIVE EXAMPLE

A Co-Cr target was subjected to sputtering under conditions of an Ar gas pressure of 40 mTorr., a power flux density of 5.1 W/cm$^2$, sputtering rate of 1700 angstrom/minute and an oxygen partial pressure of 1 mTorr, thereby forming a 0.17 μm thick Co-Cr magnetic alloy film on a non-magnetic substrate in the form of a disc.

The Co-Cr alloy thin film formed on the magnetic disc was found to have 19 atomic percent of Cr, 2.8 atomic percent of O and the balance of Co. The magnetic disc had an in-plane coercive force of 300 oersted and a squareness of 0.32. The magnetic layer was not amorphous in nature but had a hexagonal close packing structure.

The magnetic disc was then subjected to a corrosion-resistant test in the same manner as in the foregoing examples, with result that it was resistant to corrosion similar to those discs of the examples, but the isolated reproduction pulse of the disc was found to be a double-humped pulse inherent to a vertical magnetization film.

The magnetic disc was set in a recording and reproducing apparatus using a magnetic ring head having a flying height of 0.25 μm and tested to determine a reproduction output. As a result, it was found that the reproduction output was as low as 0.4 mV.

EXAMPLE 3

A 20 wt% Co-Cr alloy was sputtered, using a DC magnetron sputtering apparatus, on a NiP-plated Al substrate under the following conditions including different partial pressures of oxygen gas to form a Co-Cr amorphous magnetic alloy film having a thickness of about 0.14 and 0.16 μm, thereby obtaining magnetic recording mediums.

| | |
|---|---|
| Partial pressure of Ar | about 40 mTorr. |
| Flow rate of Ar | about 100 SCCM |
| Partial pressure of $O_2$ | about 4 mTorr. or below |
| Flow rate of $O_2$ gas | about 10 SCCM or below |
| Sputtering rate | about 0.09 to 0.12 μm/minute |
| Distance between target and Al substrate | about 100 mm |
| Temperature of Al substrate | about 150° C. |

The resulting magnetic mediums were each subjected to measurement of magnetic charcteristics similar to the foregoing examples. The results of the measurement in relation to the partial pressure of oxygen gas are shown in the sole FIGURE.

The FIGURE reveals that when the partial pressure of oxygen at the time of the sputtering is set at about $1 \times 10^3$ to $3 \times 10^{-3}$ Torr., the coercive force in the in-plane direction of the medium and squareness are large, so that the mediums have good recording and reproducing characteristics when used in combination with a magnetic ring head.

The isolated reproduction pulse was determined and found to be a single peak pulse inherent to a horizontal magnetization film. When the magnetic mediums were recorded and reproduced using a magnetic ring head having a flying height of 0.25 μm, the reproduction output was 0.8 mV or over.

The magnetic layer of the respective mediums was subjected to measurement of the composition, with the result that within the above range of oxygen partial pressure, Co was in the range of from 71 to 78 atomic percent, Cr was in the range of from 15 to 19 atomic percent, and O was in the range of from 5 to 15 atomic percent. The alloy of the layer was amorphous, not crystalline.

The respective mediums were each subjected to a corrosion-resistance test in which it was allowed to stand for 200 hours under conditions of a temperature of 60° C. and a relative humidity of 90%. Little changes appeared on the magnetic layer. Especially, with the mediums obtained under a partial pressure of $O_2$ not larger than $3 \times 10^{-3}$ Torr., the corrosion resistance was better.

What is claimed is:

1. A magnetic medium for horizontal magnetization recording which comprises a non-magnetic substrate and a magnetic recording film formed on at least one side of the substrate, said magnetic recording film consisting essentially of an amorphous Co-Cr alloy containing from 5 to 15 atomic percent of oxygen atoms, and the predominant magnetic anistropy of the magnetic recording film being a shape magnetic anistropy along an in-plane direction of the magnetic recording film.

2. A magnetic medium according to claim 1, wherein said magnetic recording film has a thickness of from 0.05 to 0.3 μm.

3. A magnetic medium according to claim 1, wherein said amorphous Co-Cr alloy has a composition of 71 to 78 atomic percent of Co, 15 to 19 atomic percent of Cr and 5 to 15 atomic percent of O.

* * * * *